(12) United States Patent
Baik et al.

(10) Patent No.: US 11,069,451 B2
(45) Date of Patent: Jul. 20, 2021

(54) MOBILE EQUIPMENT FOR MEASURING STRUCTURAL DEFORMATION OF NUCLEAR FUEL ASSEMBLY

(71) Applicant: KEPCO NUCLEAR FUEL CO., LTD., Daejeon (KR)

(72) Inventors: Mun Seog Baik, Daejeon (KR); Gi Bong Kil, Daejeon (KR); Kyung Hun Chang, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 0 days.

(21) Appl. No.: 16/633,800

(22) PCT Filed: Sep. 29, 2017

(86) PCT No.: PCT/KR2017/011024
§ 371 (c)(1),
(2) Date: Jan. 24, 2020

(87) PCT Pub. No.: WO2019/022297
PCT Pub. Date: Jan. 31, 2019

(65) Prior Publication Data
US 2020/0211723 A1    Jul. 2, 2020

(30) Foreign Application Priority Data

Jul. 25, 2017 (KR) .......................... 10-2017-0094228

(51) Int. Cl.
*G21C 17/06* (2006.01)
*G01B 11/16* (2006.01)

(52) U.S. Cl.
CPC .............. *G21C 17/06* (2013.01); *G01B 11/16* (2013.01)

(58) Field of Classification Search
CPC ........ G21C 17/06; G21C 19/32; G01B 11/16; Y02E 30/30; G21F 5/012; G21F 5/06
(Continued)

(56) References Cited

U.S. PATENT DOCUMENTS

| 4,217,173 A | * | 8/1980 | Jabsen | G21C 17/063 |
| | | | | 376/251 |
| 4,349,112 A | * | 9/1982 | Wilks | B07C 5/36 |
| | | | | 209/538 |

(Continued)

FOREIGN PATENT DOCUMENTS

JP           06058426 B2    8/1994
KR    1019900008662 B1    11/1990
(Continued)

OTHER PUBLICATIONS

International Search Report issued by ISA/KR in connection with PCT/KR2017/011024 dated Jun. 26, 2018.

(Continued)

*Primary Examiner* — Sang H Nguyen
(74) *Attorney, Agent, or Firm* — Levenfeld Pearlstein, LLC (57) ABSTRACT

Provided is mobile equipment for measuring structural deformation of a nuclear fuel assembly, the mobile equipment including: a container; a power means and a loading table disposed inside the container; a pedestal disposed on one side of the loading table of the container, the pedestal being provided with a hinge means and a fixing means configured to fix the nuclear fuel assembly upright; a column seated on the loading table and provided at one end part thereof with a rotating shaft detachably installed to the hinge means, and configured to be erected upright on the fixing means of the pedestal by power of the power means; and a scanner configured to move upward and downward in a (Continued)

longitudinal direction of the column and to measure the structural deformation of the nuclear fuel assembly.

5 Claims, 8 Drawing Sheets

(58) Field of Classification Search
USPC .......................................................... 376/272
See application file for complete search history.

(56) References Cited

U.S. PATENT DOCUMENTS

| | | | | |
|---|---|---|---|---|
| 4,647,422 | A * | 3/1987 | Altman | G21C 17/00 376/260 |
| 5,089,213 | A * | 2/1992 | Omote | G21C 17/06 376/248 |
| 6,748,042 | B1 * | 6/2004 | Stilwell, III | G21F 5/08 376/272 |
| 2003/0085347 | A1 * | 5/2003 | Chesterman | G21C 17/063 250/252.1 |
| 2010/0196624 | A1 * | 8/2010 | Ruuttu | B23K 26/067 427/569 |
| 2012/0008729 | A1 * | 1/2012 | Chang | G21F 5/06 376/272 |
| 2017/0025195 | A1 * | 1/2017 | Pineiro Fernandez | G21C 19/207 |
| 2017/0263339 | A1 * | 9/2017 | Eichel | G21C 3/17 |
| 2017/0358375 | A1 * | 12/2017 | Sengbusch | G21G 4/02 |
| 2019/0131023 | A1 * | 5/2019 | Littmann | G01N 29/07 |

FOREIGN PATENT DOCUMENTS

| | | |
|---|---|---|
| KR | 100680483 B1 | 2/2007 |
| KR | 1020080072618 A | 8/2008 |
| KR | 20110067724 A | 6/2011 |
| KR | 1020120006177 A | 1/2012 |

OTHER PUBLICATIONS

Written Opinion issued by ISA/KR in connection with PCT/KR2017/011024 dated Jun. 26, 2018.

* cited by examiner

FIG. 1

-- Prior Art --

MOBILE EQUIPMENT FOR MEASURING STRUCTURAL DEFORMATION OF NUCLEAR FUEL ASSEMBLY

This is a National Stage Application of International Patent Application No. PCT/KR2017/011024, filed Sep. 29, 2017, which claims the benefit of and priority to Korean Application No. 10-2017-0094228, filed Jul. 25, 2017, the entirety of which are incorporated fully herein by reference.

TECHNICAL FIELD

The present invention relates to mobile equipment for measuring structural deformation of a nuclear fuel assembly and, more particularly, to mobile equipment for measuring structural deformation of a nuclear fuel assembly, which enhances accuracy of measuring the structural deformation of the nuclear fuel assembly and is configured as a container type suitable to be movable.

BACKGROUND ART

A nuclear power plant is configured to heat a primary coolant using energy generated during nuclear fission by using nuclear fuel inside a nuclear reactor, to transfer heated energy of the primary coolant to a steam generator, thereby transferring the energy to a secondary coolant and generating steam in the steam generator, to rotate a turbine using the steam, and to convert rotational energy of the turbine into electric power by a generator.

Energy sources for the nuclear fission are provided by the nuclear fuel.

Figure 1:
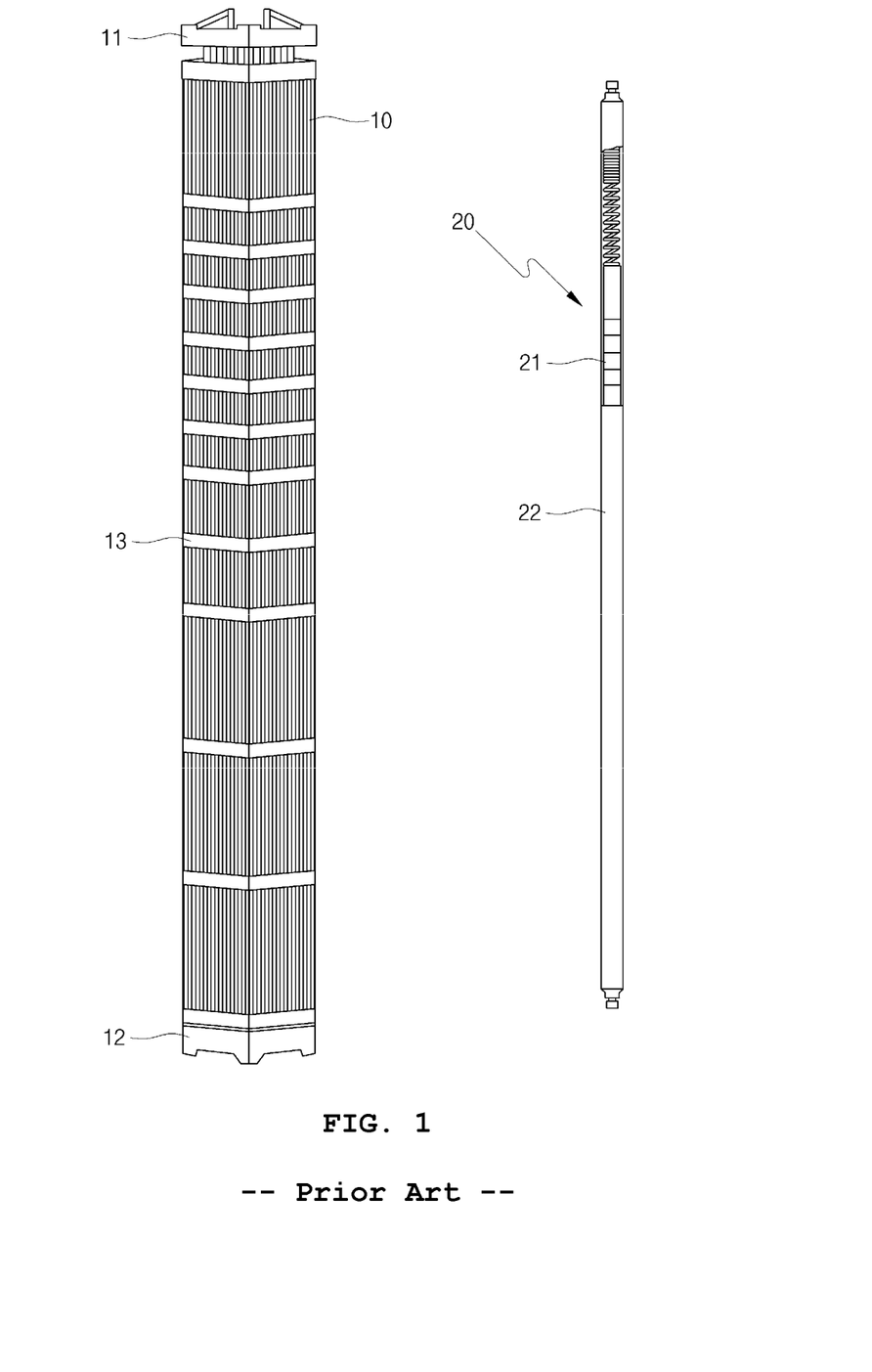
FIG. 1 is a view showing a nuclear fuel assembly and a nuclear fuel rod, each as a single unit.

The nuclear fuel arranged inside the nuclear reactor is composed of nuclear fuel assemblies 10, with each nuclear fuel assembly as a unit, as shown in FIG. 1, and the nuclear fuel assembly 10 includes a framework composed of a top nozzle 11, a bottom nozzle 12, and spacer grid assemblies 13; and nuclear fuel rods 20 each inserted into the spacer grid assemblies 13 and supported by springs and dimples provided in the spacer grid assemblies 13.

At this time, each of the nuclear fuel rods 20 is composed of a plurality of uranium pellets 21 and a zirconium alloy cladding tube 22 provided in the form of a long bar for protecting the uranium and preventing radiation leakage.

In manufacturing such a nuclear fuel assembly 10, in order to prevent scratches on a surface of the nuclear fuel rod 20 and to prevent damage to the spacer grid assemblies 13, lacquer is applied to the surface of the fuel rod 20. Thereafter, a plurality of the nuclear fuel rods 20 is inserted into the framework, followed by attaching and fixing the top and bottom nozzles 11 and 12, whereby the assembly of the nuclear fuel assembly 10 is completed.

Thereafter, after removing the lacquer of the completed nuclear fuel assembly 10, a process of manufacturing the nuclear fuel assembly 10 is completed by inspecting gaps, warpage, full length, dimensions, and the like between the fuel rods 20.

Meanwhile, the nuclear fuel assembly 10, the manufacturing process of which is completed as described above, is not directly introduced into the reactor but is inspected to determine whether the nuclear fuel assembly 10 is structurally deformed.

This is for preventing a collision between neighboring fuel assemblies 10 in a process of arranging a plurality of fuel assemblies 10 in the reactor.

That is, when structural deformation occurs in the nuclear fuel assembly during structural assembling of the nuclear fuel assembly 10, the collision with the neighboring nuclear fuel assemblies 10 may occur, and thus the cladding tube 22 of the nuclear fuel rod 20 may be damaged. When the cladding tube 22 of the nuclear fuel rod 20 is damaged, radioactivity may be excessively leaked from the nuclear fuel, thereby intensifying contamination of the primary coolant. In the case of severe damage, the nuclear fuel rods 20 may be dropped out and moved inside the reactor, thereby causing a highly risky situation.

Therefore, since the nuclear fuel assembly 10 is required to have a high degree of reliability with respect to the quality thereof, work of inspecting the structural deformation of the nuclear fuel assembly 10 is obviously a very important task.

Accordingly, it is urgent to develop equipment for measuring and inspecting the structural deformation of the nuclear fuel assembly 10.

Naturally, as disclosed in the related art, equipment for measuring a structure of the nuclear fuel assembly 10 has been provided but has been limited to measuring a structure of the spacer grid assemblies 13 of the nuclear fuel assembly 10, thereby having a problem of being limited in measuring the nuclear fuel assembly 10 as a whole.

DOCUMENTS OF RELATED ART

Patent Document (Patent Document 1) Korean Patent No. 10-1244865

DISCLOSURE

Technical Problem

Accordingly, the present invention has been made keeping in mind the above problems occurring in the related art, and an object of the present invention is to provide a mobile equipment for measuring structural deformation of a nuclear fuel assembly, which measures overall structural deformation of a manufactured nuclear fuel assembly, thereby enhancing accuracy of measuring the quality of the nuclear fuel assembly, and is configured as a container type suitable to be movable, thereby enhancing operational efficiency for measurement sites without being limited to a specific site.

Technical Solution

In order to accomplish the above object, the present invention provides mobile equipment for measuring structural deformation of a nuclear fuel assembly, the mobile equipment including: a container; a power means and a loading table disposed inside the container; a pedestal disposed on one side of the loading table of the container, the pedestal being provided with a hinge means and a fixing means configured to fix the nuclear fuel assembly upright; a column seated on the loading table and provided at one end part thereof with a rotating shaft detachably installed to the hinge means, and configured to be erected upright on the fixing means of the pedestal by power of the power means, around the rotating shaft coupled to the hinge means; and a scanner configured to move upward and downward in a longitudinal direction of the column being erected upright on the pedestal and to measure the structural deformation of the nuclear fuel assembly being erected upright on the fixing means.

At this time, the hinge means may include: a holder installed on each of both sides of one end part of the pedestal and provided with a rail installed toward the column; a first body installed on the holder, configured to move along the rail of the holder, and provided with a first accommodating groove configured to accommodate a portion of the rotating shaft; and a second body configured to rotate toward the first body by being axially coupled to one end part of the first body and provided with a second accommodating groove configured to accommodate a remaining portion of the rotating shaft.

In addition, a standard for scanner calibration is provided in a longitudinal direction of the loading table at an inside of the container, wherein the standard is configured to be detachably fixed to the fixing means and to be erected upright on the column, in a rectilinear shape.

In addition, supports may be installed on either side of the pedestal inside the container, wherein each of the supports may include: a horizontal stand configured to be horizontally rotated toward an inside or an outside of the container, and a vertical stand configured to be vertically rotated toward the ground at one end part of the horizontal stand.

Advantageous Effects

As described above, the mobile equipment for measuring structural deformation of the nuclear fuel assembly according to the present invention has the following effects.

First, since it is possible to measure whether or not the structural deformation of an entire nuclear fuel assembly has occurred, there is an effect that the accuracy of measuring the structural deformation of the nuclear fuel assembly can be enhanced.

That is, in relation to the overall structure of the nuclear fuel assembly, an envelope, length, and a maximum slope can be measured, whereby whether or not the structural deformation of not only a specific portion of the nuclear fuel assembly but also the entire nuclear fuel assembly has occurred can be measured.

Accordingly, since only a high-quality nuclear fuel assembly is to be introduced into the reactor, damage of the nuclear fuel assembly due to a collision between neighboring fuel assemblies does not occur, and there is an effect of preventing a large accident.

Second, the components constituting the measuring equipment are configured to be separated from and combined with each other, and the measuring equipment is configured as a container type, thereby allowing the components to be transported by transport means so that the measuring equipment can be efficiently carried and moved to a desired site.

Accordingly, since it is possible to measure the nuclear fuel assembly anywhere without being limited to a specific site, the operational efficiency for a measurement space of the nuclear fuel assembly can be improved.

BEST MODE

Terms or words used in the present specification and claims are not to be construed as limiting to usual or dictionary meanings thereof. On the basis of a principle that the inventors may properly define the concept of the terms in order to best explain the invention thereof in the best way possible, it should be interpreted as meaning and concept corresponding to the technical idea of the present invention.

Hereinafter, mobile equipment for measuring structural deformation of a nuclear fuel assembly according to an exemplary embodiment of the present invention will be described with reference to the accompanying FIGS. 2 to 8.

The mobile equipment for measuring structural deformation of the nuclear fuel assembly is configured to have a technical feature that allows the overall structural deformation of the nuclear fuel assembly to be measured before the manufactured nuclear fuel assembly is introduced into a nuclear reactor.

Accordingly, since only the nuclear fuel assembly meeting required criteria may be allowed to be introduced into the nuclear reactor, accidents caused by nuclear fuel assembly collisions may be prevented in advance.

In addition, the mobile equipment is configured as a container type suitable to be transportable and movable, whereby sites for measuring the nuclear fuel assembly become free from restriction.

Accordingly, it is possible to enhance operational efficiency for measurement sites.

The mobile equipment for measuring structural deformation of the nuclear fuel assembly (hereinafter referred to as "measuring equipment") includes a container 100, a loading table 200, a pedestal 300, a column 400, a scanner 500, a standard 600, and supports 700.

The container 100 constitutes overall appearance of the measuring equipment and serves to protect the constituents for the actual measurement from the outside.

In addition, the container 100 may provide an inner space and may be provided in a quadrangular shape so as to be easily transported and moved.

Figure 2:
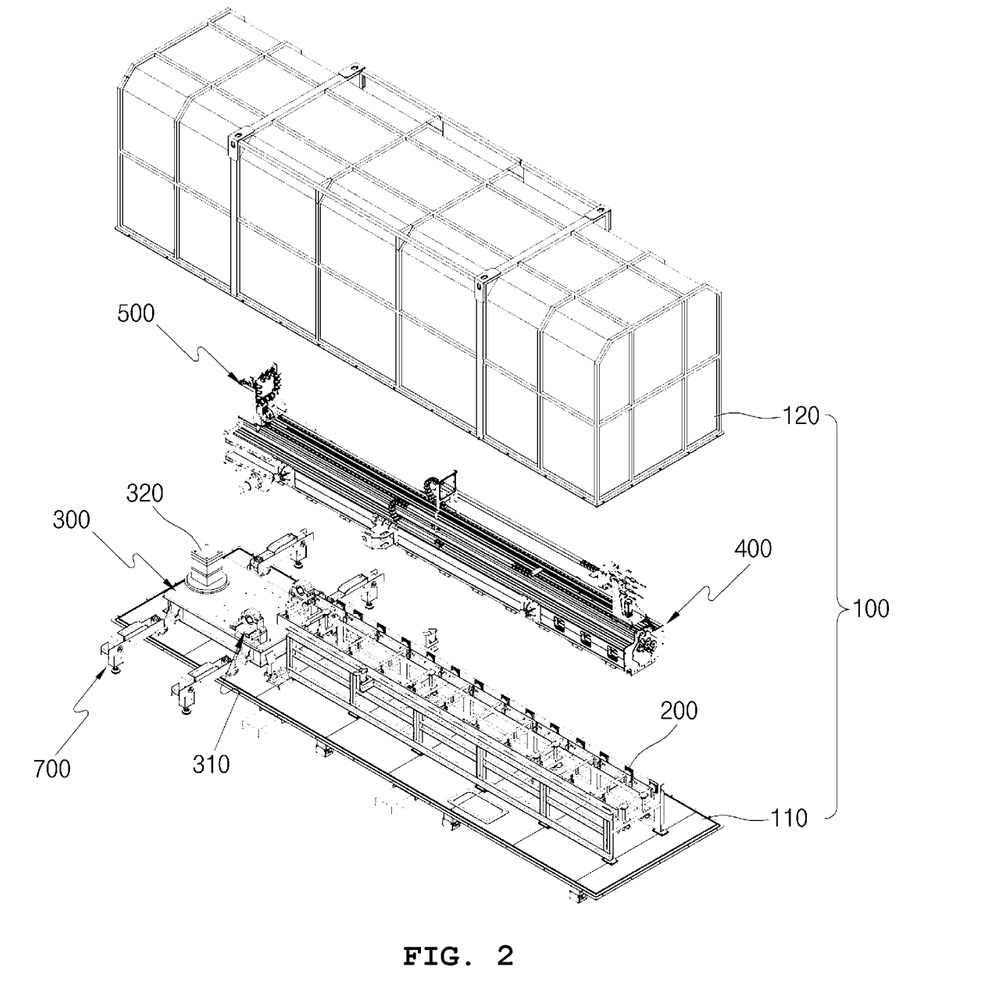
FIG. 2 is an exploded perspective view showing mobile equipment for measuring structural deformation of a nuclear fuel assembly according to an exemplary embodiment of the present invention.
Figure 3:
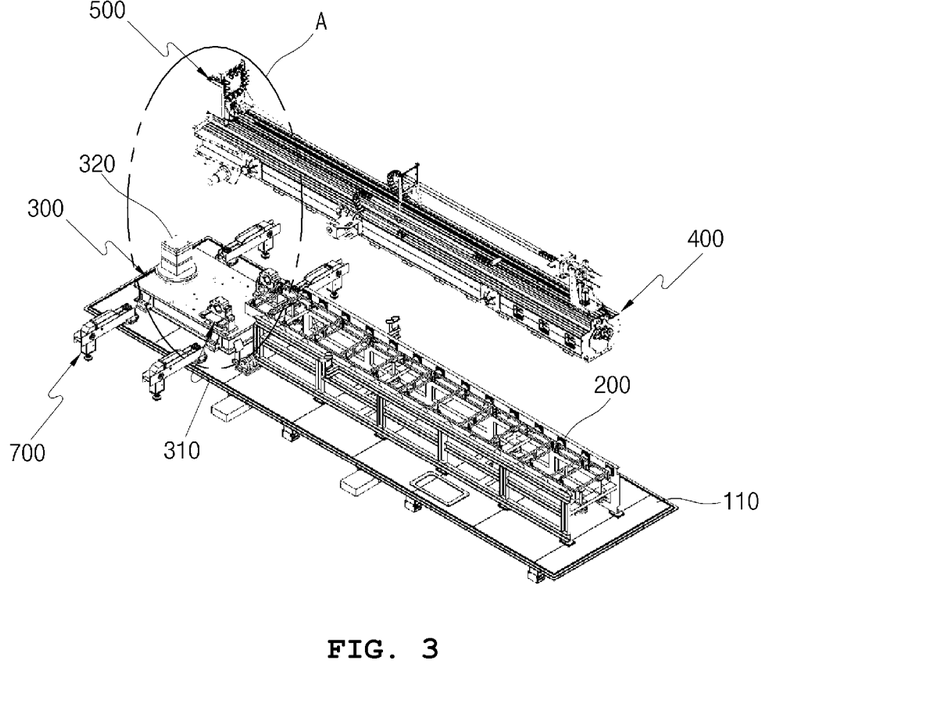
FIG. 3 is a perspective view showing internals of a container of the mobile equipment for measuring structural deformation of the nuclear fuel assembly according to the exemplary embodiment of the present invention.

In addition, the container 100 may be composed of a base 110 and a cover 120 that may cover the base 110 as shown in FIG. 2, in order to allow an interior thereof to be easily opened.

Next, the loading table 200 is configured to seat the column 400 constituting the measuring equipment and is fixed in a longitudinal direction of the base 110.

At this time, the loading table 200 may be provided with a buffer material (not shown) along a surface contacting the column so that the transport of the column 400 may be stably made.

In addition, a configuration of the loading table 200 is not specifically limited but may be composed of a plurality of frames.

On the other hand, a power means 210 is installed on one side of the loading table 200.

Here, the power means 210 generates power to erect the column 400 seated on the loading table 200 upright, and a hydraulic cylinder may be provided therefor.

Here, the power means 210 may be installed at a position of an inner side of the loading table 200, which is composed of a frame, in order to enhance efficiency of an interior space of the container 100.

Next, the pedestal 300 provides a space for the column 400 to be erected upright and is installed on one side of the loading table 200.

That is, the column 400 is transported and moved in a state of being laid on the loading table 200, but the column 400 is to be erected upright at a site where measuring is performed. At this time, the pedestal 300 supports a bottom end of the column 400 that is erected upright.

Meanwhile, the pedestal 300 provides a flat surface and includes a pair of hinge means 310 and a fixing means 320.

The pair of hinge means 310 is configured to rotate the column 400, by allowing a pair of rotating shafts of the column 400 to be described later to be coupled therewith, so that the column 400 may be erected upright with the pair of the hinge means 310 as a center.

The pair of hinge means 310 is fixed to both ends of one end side of the pedestal 300, and each of the pair of the hinge means 310 may include a holder 311, a first body 312, and a second body 313.

The holder 311 is a part fixed to the pedestal 300 and is provided with a rail 311a.

The rail 311a is a means configured to allow the first body 312 and the second body 313 to reciprocate toward the rotating shaft of the column 400 to be described later on the holder 311.

The first body 312 provides a first accommodating groove 312a configured to accommodate a part of the rotating shaft of the column 400. In addition, the first body 312 reciprocates along the rail 311a.

The first accommodating groove 312a may be provided in a semicircle corresponding to a half of a circumference of the rotating shaft so that the rotating shaft may be stably accommodated.

Although not shown, a movement of the first body 312 on the rail 311a may be performed through power of a motor and the like.

The second body 313 provides a second accommodating groove 313a configured to accommodate a remaining part of the rotating shaft accommodated in the first accommodating groove 312a and is hinge-coupled to an end part of the first body 312.

That is, the second body 313 is rotated with an end part of the first body 312 as a reference and is installed so as to cover the rotating shaft accommodated in the first accommodating groove 312a.

Figure 4:
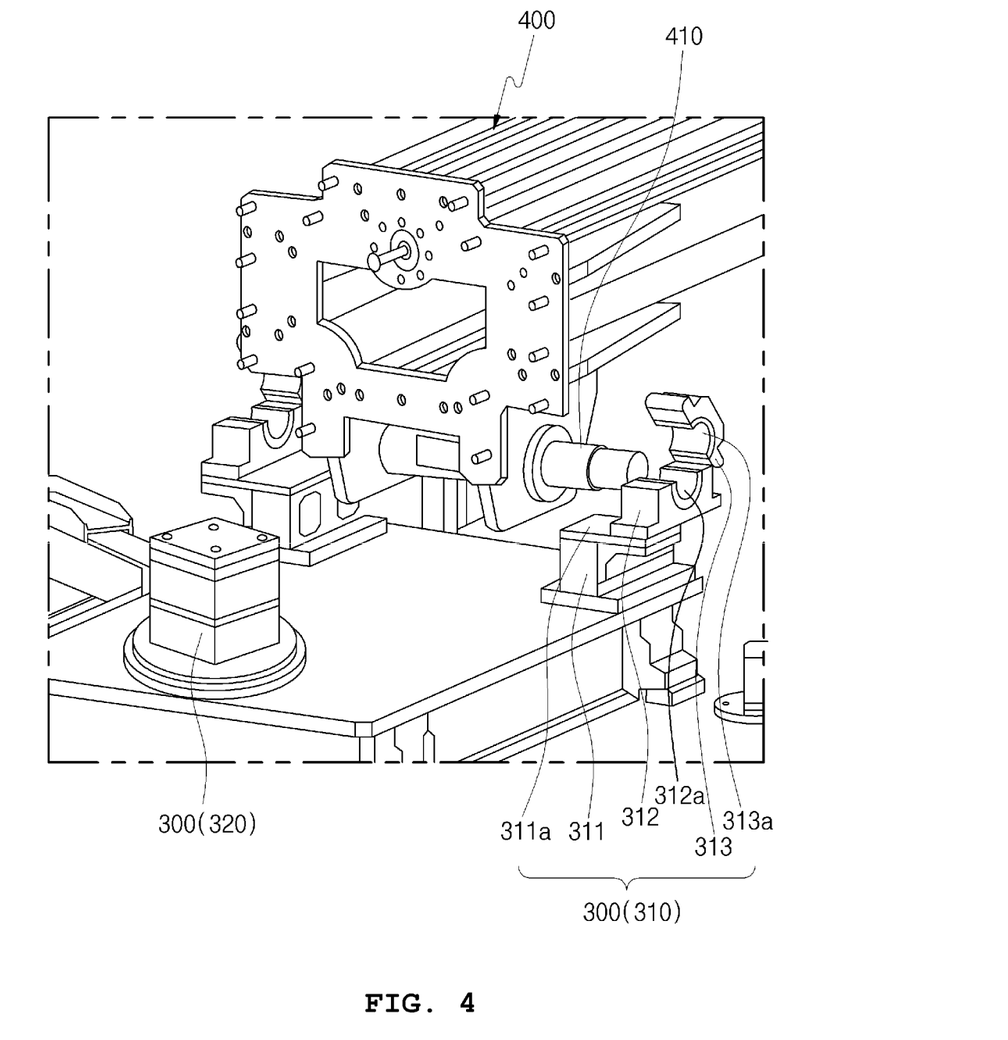
FIG. 4 is an enlarged perspective view showing a state where two parts in "A" of FIG. 3 are coupled with each other.

In addition, the fixing means 320 is configured to fix the nuclear fuel assembly to be measured upright and is installed on an opposite side of the pedestal 300 as shown in FIG. 4.

At this time, the standard 600 for calibration of the scanner 500 may be fixed to the fixing means 320, wherein the scanner 500 is a nuclear fuel assembly measurement instrument.

Next, the column 400 is configured to allow the scanner 500 for measuring the nuclear fuel assembly to move upward and downward and is provided by being seated on the loading table 200.

That is, for measuring the overall structural deformation of the nuclear fuel assembly, the nuclear fuel assembly is erected upright to the fixing means 320, and for measuring the nuclear fuel assembly which is erected upright, the scanner 500 performs scanning while moving along one end and an opposite end of the nuclear fuel assembly. To this end, the column 400 is configured to provide a scanner 500 a movement path.

The column 400 is provided in a state being laid in a longitudinal direction of the container 100 on the loading table 200, and the buffer material installed on the loading table 200 may prevent friction between the column 400 and the loading table 200.

The pair of the rotating shafts 410 is installed at both sides of one end part of the column 400.

The pair of the rotating shafts 410 is coupled to the pair of the hinge means 310 and serves as a shaft to erect the column 400 being laid on the loading table 200 upright.

The column 400 configured as described above is transported and moved in a state being laid on the loading table 200, and the pair of the rotating shafts 410 is coupled to the pair of the hinge means 310 at the time of measurement work. Subsequently, the column 400 is rotated with the pair of the rotating shafts 410 as a center, thereby being erected upright and used.

Next, the scanner 500 is a device for measuring the structural deformation of the nuclear fuel assembly, which is a measurement object fixed to the fixing means 320, so as to check whether or not the structural deformation exists, and is movably installed in the longitudinal direction of the column 400.

In addition, the scanner 500 measures an envelope, length and a maximum slope of the nuclear fuel assembly and includes a displacement sensor, a level meter, and the like.

The envelope is a degree that the outer shape of the square nuclear fuel assembly in a plan view is out of the "virtual square" in a state where the top and bottom nozzles of the nuclear fuel assembly are fixed and is a criterion for measuring deformation of the spacer grid assembly so as to check whether or not the deformation exists.

In addition, the maximum slope is a degree that the nuclear fuel assembly in a state of being erected upright without being restrained is inclined.

Next, the standard 600 is a standard member provided for measuring the length, envelope, and maximum slope of the nuclear fuel assembly, and is provided on one side of the base 110 of the container 100.

That is, calibration work of the scanner 500 through the standard 600 is performed before measuring the nuclear fuel assembly, whereby the accuracy of measuring the later nuclear fuel assembly through the scanner 500 may enhanced.

Next, the supports 700 are configured to fix the base 110 to the ground at the time of measuring the nuclear fuel assembly and are installed on both sides of the base 110 with the pedestal 300 as a reference.

That is, the supports 700 are configured to enhance the accuracy of measuring the nuclear fuel assembly by preventing the base 110 disposed on the ground from moving when the nuclear fuel assembly is measured.

Figure 5:
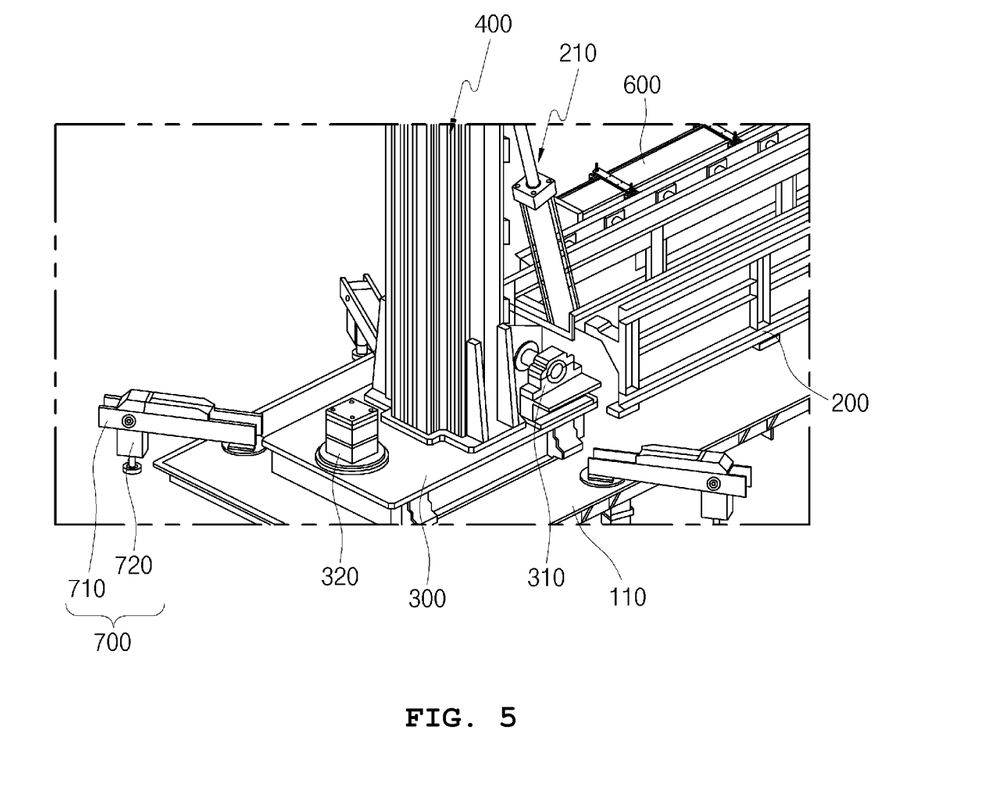
FIG. 5 is an enlarged perspective view of a pedestal portion of the mobile equipment for measuring structural deformation of the nuclear fuel assembly according to the exemplary embodiment of the present invention.
Figure 6:
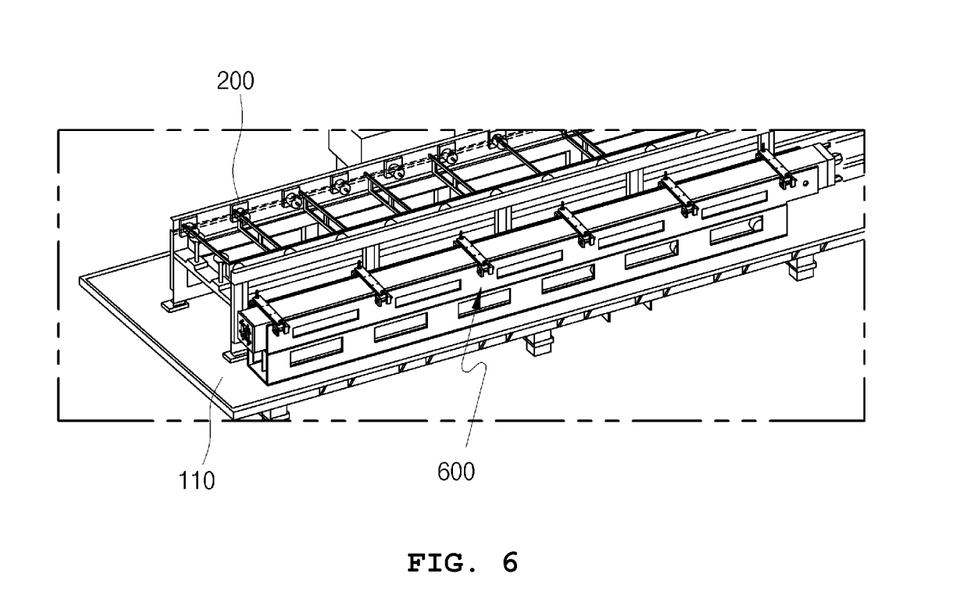
FIG. 6 is a perspective view showing a part where a standard of the mobile equipment for measuring structural deformation of the nuclear fuel assembly according to the exemplary embodiment of the present invention is installed.

Each support 700 includes a horizontal stand 710 and a vertical stand 720, as shown in FIG. 5.

The horizontal stand 710 is configured to allow the vertical stand 720 to be exposed from the inside of the container 100, that is, the base 110, toward the ground, thereby providing the vertical stand 720 to correspond to the ground.

The vertical stand 720 is configured to be actually supported on the ground and is installed at an end part of the horizontal stand 710.

At this time, the vertical stand 720 is axially rotatably coupled to the end part of the horizontal stand 710.

That is, the vertical stand 720 is installed in the same direction as the horizontal stand 710 in order to increase the utilization of the interior space of the container 100 at the inside of the container 100 but is configured to be vertically supported on the ground at the outside of the container 100 by being rotated as shown in FIG. 5.

Hereinafter, a process of measuring the nuclear fuel assembly by using the mobile equipment for measuring structural deformation of the nuclear fuel assembly, which is configured as described above, will be described with reference to FIG. 8.

Figure 8:
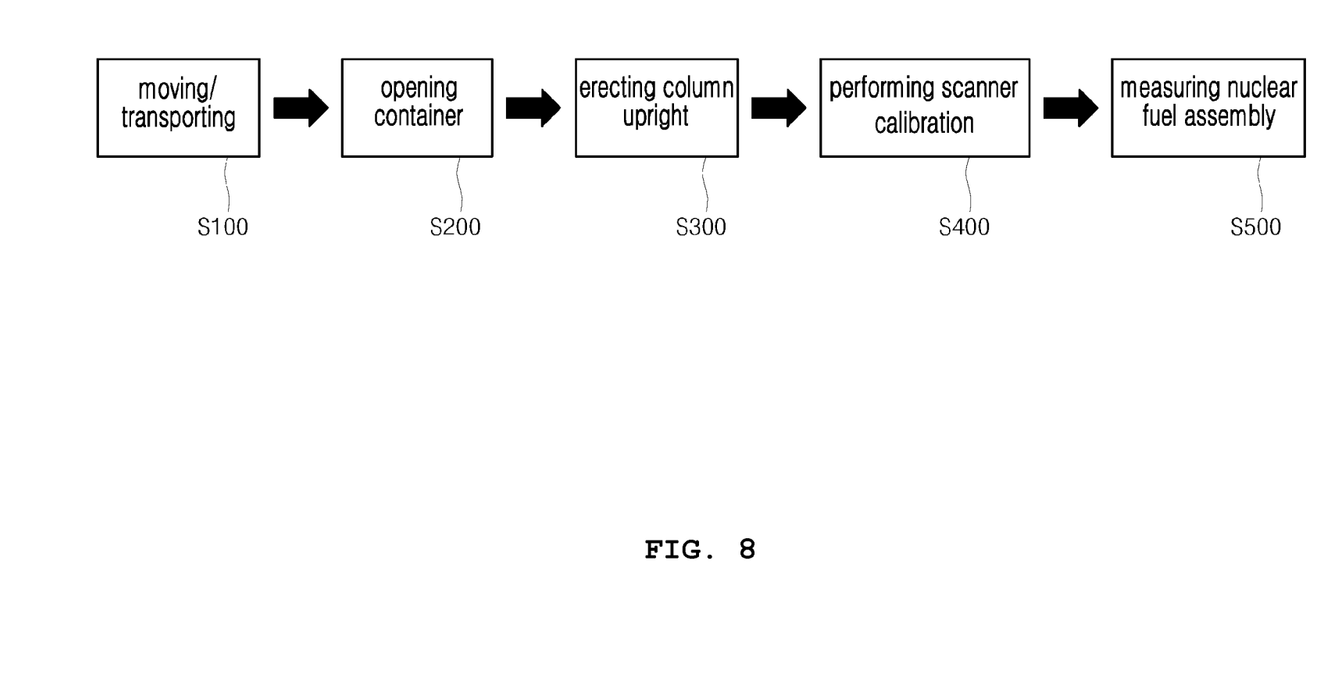
FIG. 8 is a simplified diagram showing a process in which measuring the nuclear fuel assembly is performed using the mobile equipment for measuring structural deformation of the nuclear fuel assembly according to the exemplary embodiment of the present invention.

The measuring equipment stored in the container 100 is transported to the measurement site at 5100.

In this case, the container 100 may be transported by land, sea, or air.

Meanwhile, the container 100 transported to the measurement site is removed of the cover thereof for measuring the nuclear fuel assembly, whereby the measuring equipment provided on the base 110 is exposed to the outside at 5200.

Next, the horizontal stand 710 of the support 700 is rotated to and positioned at the outside of a boundary of the base 110.

Next, the vertical stand 720 is rotated and supported to the ground, whereby the base 110 is fixed to the ground without moving.

At this time, the vertical stand 720 is configured to allow the height thereof to be adjusted, thereby providing a stable support force even when the ground is uneven.

Next, when the support 700 has been installed, the restraint of the column 400 fastened to the loading table 200 is released.

That is, a fastening means such as a bolt that is fastened so that the column 400 does not move on the loading table 200 at the time of transport is released, whereby the restraint of the column 400 is released.

Next, the first body 312 is moved to the rotating shaft 410 of the column 400 on the rail 311a of the holder 311.

At this time, the lower portion of the rotating shaft 410 is accommodated in the first accommodating groove 312a of the first body 312.

Next, the second body 313 is rotated, thereby allowing the second accommodating groove 313a to cover and fix the upper portion of the rotating shaft 410.

Accordingly, the rotating shaft 410 of the column 400 is axially coupled with the hinge means 310.

Next, the hydraulic cylinder which is the power means 210 is connected to the column.

That is, an end part of the hydraulic cylinder 210 is axially coupled to the lower portion of the column 400 seated on the loading table 200.

Next, the hydraulic cylinder 210 is operated, thereby allowing the hydraulic cylinder 210 to erect the column 400 upright at 5300.

Figure 7:
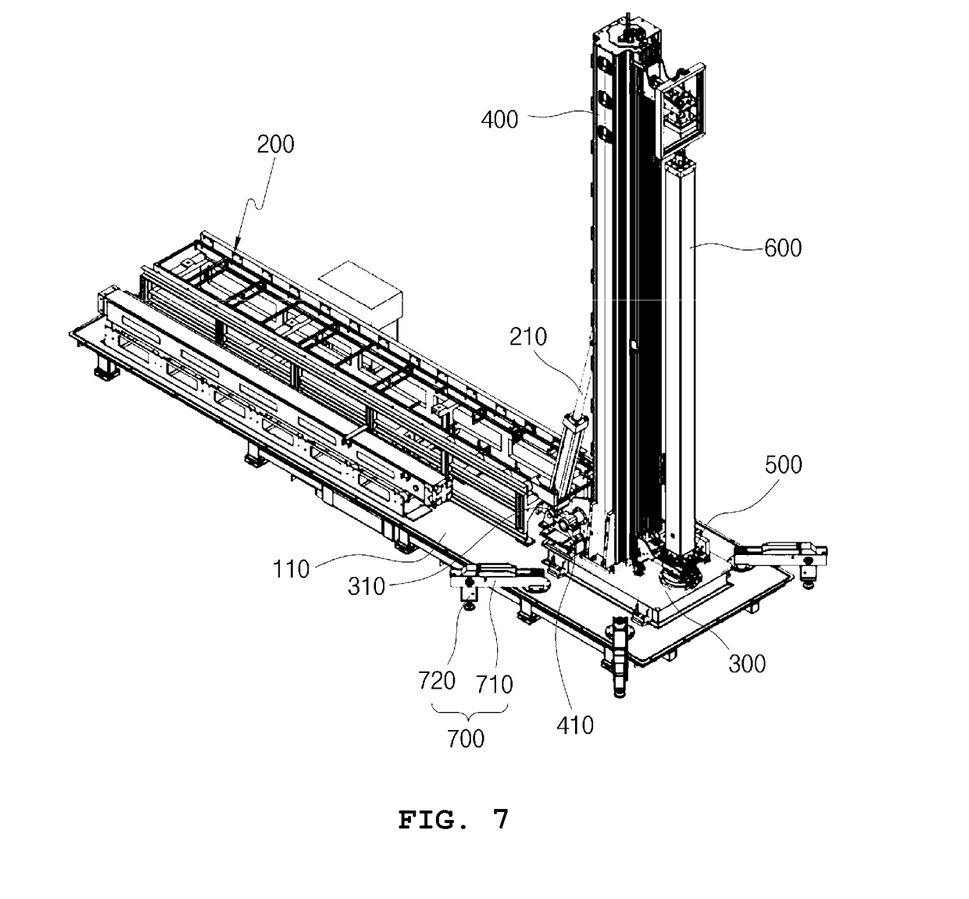
FIG. 7 is a perspective view showing a state where a column is erected upright and the standard is erected upright on the column to calibrate a scanner in the mobile equipment for measuring structural deformation of the nuclear fuel assembly according to the exemplary embodiment of the present invention.

Accordingly, the column 400 is in a state of being erected upright on the pedestal 300, as shown in FIG. 7.

In addition, the column 400 is provided to allow the scanner 500 to move upward and downward in a height direction of the column 400.

Next, in order to enhance the accuracy of measured values of the nuclear fuel assembly through the scanner 500, the calibration work of the scanner is performed at 5400.

To this end, the standard 600 provided on one side of the base 110 is fixed to the fixing means 320 of the pedestal 300.

Accordingly, as shown in FIG. 7, the standard 600 is in a state of being erected upright on the column 400.

Subsequently, the scanner 500 is operated, whereby the work to calibrate the standard value information of the scanner 500 is performed while the standard 600 is measured.

That is, through the standard 600, the work is performed to calibrate a standard length value of the standard, a standard value of the envelope, a standard value of the maximum slope, and the like of the scanner 500 are performed.

Next, when the calibration work of the scanner has been completed, the standard 600 is returned to an original position thereof using a crane, and the nuclear fuel assembly is fixed to the fixing means 320 of the pedestal 300.

Next, when the scanner 500 is operated, the scanner 500 moves upward and downward along the column 400, thereby measuring the length, envelope, slope, and the like of the nuclear fuel assembly. Accordingly, the scanner 500 compares the values measured through the nuclear fuel assembly with the standard values measured through the standard 600, thereby measuring the structural deformation of the nuclear fuel assembly at 5500.

Next, when measuring the nuclear fuel assembly has been completed, the container 100 is restored to an original state thereof by covering the cover 120 over the base 110 by performing the above-described series of procedures in reverse order.

Next, the container 100 is transported to another site, whereby the operation for measuring structural deformation of the nuclear fuel assembly is completed.

As described above, the mobile equipment for measuring structural deformation of the nuclear fuel assembly according to the present invention has a technical feature such that the mobile equipment measures whether or not the overall structure of the nuclear fuel assembly is deformed, and is configured as a container type, thereby being allowed to be moved and transported.

Accordingly, according to the present invention, the accuracy of measuring the structural deformation of the nuclear fuel assembly may be enhanced, and the efficiency of the measurement work may be increased because of no restriction due to the measurement site.

Although the present invention has been described in detail with respect to the described embodiments, it will be apparent to those skilled in the art that various modifications and variations are possible within the technical scope of the present invention, and such modifications and variations are within the scope of the appended claims.

DESCRIPTION OF THE REFERENCE NUMERALS IN THE DRAWINGS

| | |
|---|---|
| 100: container | 110: base |
| 120: cover | 200: loading table |
| 210: power means (hydraulic cylinder) | |
| 300: pedestal | |
| 310: hinge means | 311: holder |
| 311a: rail | 312: first body |
| 312a: first accommodating groove | |
| 313: second body | |
| 313a: second accommodating groove | |
| 320: fixing means | |
| 400: column | 410: rotating shaft |
| 500: scanner | 600: standard |
| 700: support | 710: horizontal stand |
| 720: vertical stand | |

The invention claimed is:

1. A mobile equipment for measuring structural deformation of a nuclear fuel assembly, the mobile equipment comprising:
a container;
a device for providing power and a loading table disposed inside the container;
a pedestal disposed on one side of the loading table of the container, the pedestal being provided with a hinge device and a fixing device configured to fix the nuclear fuel assembly upright;
a column seated on the loading table and provided at one end part thereof with a rotating shaft detachably installed to the hinge device, and configured to be erected upright on the fixing device of the pedestal by power provided by the device for providing power, around the rotating shaft coupled to the hinge device; and
a scanner configured to move upward and downward in a longitudinal direction of the column being erected upright on the pedestal and to measure the structural deformation of the nuclear fuel assembly being erected upright on the fixing device,
wherein the hinge device comprises:
a holder installed on each of both sides of one end part of the pedestal and provided with a rail installed toward the column;
a first body installed on the holder, configured to move along the rail of the holder, and provided with a first accommodating groove configured to accommodate a portion of the rotating shaft; and
a second body configured to rotate toward the first body by being axially coupled to one end part of the first body and provided with a second accommodating groove configured to accommodate a remaining portion of the rotating shaft.

2. The mobile equipment of claim 1, wherein a standard for scanner calibration is provided in a longitudinal direction of the loading table at an inside of the container, and the standard is configured to be detachably fixed to the fixing device and to be erected upright adjacent to the column, in a rectilinear shape.

3. The mobile equipment of claim 1, wherein supports are installed on either side of the pedestal inside the container, wherein each of the supports comprises:
a horizontal stand configured to be horizontally rotated toward an inside or an outside of the container, and
a vertical stand configured to be vertically rotated toward the ground at one end part of the horizontal stand.

4. A mobile equipment for measuring structural deformation of a nuclear fuel assembly, the mobile equipment comprising:
a container;
a device for providing power and a loading table disposed inside the container;
a pedestal disposed on one side of the loading table of the container, the pedestal being provided with a hinge device and a fixing device configured to fix the nuclear fuel assembly upright;
a column seated on the loading table and provided at one end part thereof with a rotating shaft detachably installed to the hinge device, and configured to be erected upright on the fixing device of the pedestal by power provided by the device for providing power, around the rotating shaft coupled to the hinge device; and
a scanner configured to move upward and downward in a longitudinal direction of the column being erected upright on the pedestal and to measure the structural deformation of the nuclear fuel assembly being erected upright on the fixing device,
wherein a standard for scanner calibration is provided in a longitudinal direction of the loading table at an inside of the container, and the standard is configured to be detachably fixed to the fixing device and to be erected upright adjacent to the column, in a rectilinear shape.

5. The mobile equipment of claim 4, wherein supports are installed on either side of the pedestal inside the container, wherein each of the supports comprises:
a horizontal stand configured to be horizontally rotated toward an inside or an outside of the container, and
a vertical stand configured to be vertically rotated toward the ground at one end part of the horizontal stand.

* * * * *